United States Patent
Lim et al.

(10) Patent No.: US 12,514,806 B2
(45) Date of Patent: Jan. 6, 2026

(54) COSMETIC COMPOSITION COMPRISING CERAMIDES AND SPHINGOLIPID

(71) Applicant: Croda Korea Ltd, Iksan-si (KR)

(72) Inventors: So Jung Lim, Yongin-si (KR); Mi Kyung Sung, Yongin-si (KR); Sang Chul Kim, Yongin-si (KR); Ji Hye Han, Yongin-si (KR); Seung Won Park, Yongin-si (KR)

(73) Assignee: Croda Korea Ltd., Jeollabuk-Do (KR)

( * ) Notice: Subject to any disclaimer, the term of this patent is extended or adjusted under 35 U.S.C. 154(b) by 308 days.

(21) Appl. No.: 18/130,595

(22) Filed: Apr. 4, 2023

(65) Prior Publication Data
US 2024/0173240 A1    May 30, 2024

(30) Foreign Application Priority Data
Oct. 20, 2022    (KR) .................. 10-2022-0135792

(51) Int. Cl.
*A61K 8/68* (2006.01)
*A61K 31/16* (2006.01)
*A61P 17/00* (2006.01)
*A61Q 19/08* (2006.01)

(52) U.S. Cl.
CPC .............. *A61K 8/68* (2013.01); *A61K 31/16* (2013.01); *A61P 17/00* (2018.01); *A61Q 19/08* (2013.01); *A61K 2800/78* (2013.01)

(58) Field of Classification Search
CPC ......... A61K 8/68; A61K 31/164; A61Q 19/00
See application file for complete search history.

(56) References Cited

U.S. PATENT DOCUMENTS

2003/0059447 A1* 3/2003 Lambers .............. A61K 8/68
424/401

FOREIGN PATENT DOCUMENTS

| CN | 102579297 A | 7/2012 | | |
| CN | 103315934 A | 9/2013 | | |
| CN | 113693986 A | * 11/2021 | | |
| CN | 114053201 A | * 2/2022 | .............. | A61K 8/63 |
| CN | 114129479 A | 3/2022 | | |
| JP | 2022-134357 A | 9/2022 | | |
| KR | 10-1899025 B1 | 9/2018 | | |
| KR | 10-2019-0134582 A | 12/2019 | | |
| KR | 10-2021-0068692 A | 6/2021 | | |
| KR | 10-2021-0071901 A | 6/2021 | | |
| KR | 10-2405326 B1 | 6/2022 | | |

OTHER PUBLICATIONS

Regimenlab (Regimen Lab Skincare Encyclopedia, Ceramides, downloaded May 2025, https://regimenlab.com/blogs/skincare-encyclopedia/ceramides?srsltid=AfmBOoqrHURBvxn9zrISFQUOh0m1e96BEivAee8cVgu_7okRFTyzn6Rn) (Year: 2025).*
CN-114053201-A (Google English Translation, downloaded May 2025) (Year: 2025).*
CN-113693986-A (Google English Translation, downloaded May 2025) (Year: 2025).*
Yong et al (Experimental Dermatology, Feb. 2025, https://doi.org/10.1111/exd.70042) (Year: 2025).*
Database GNPD Mintel—Apr. 10, 2018, Anonymous: "Sensitive Cream", XP055626967, Database accession No. 5550201. (3 pages).
Database GNPD Mintel—Oct. 7, 2010, Anonymous: "Nourishing Eye & Eyelid Cream", XP093039127, Database accession No. 1410240. (4 pages).
GNPD Mintel—Jan. 1, 2011, "Ultim-Age The Ultimate Anti-Ageing Serum", XP002775142, Database accession No. 1480536. (6 pages).
The Extended European Search Report issued Oct. 5, 2023, by the European Patent Office in corresponding European Patent Application No. 23164187.9-1109. (8 pages).

* cited by examiner

Primary Examiner — Mark V Stevens
(74) Attorney, Agent, or Firm — Buchanan Ingersoll & Rooney PC

(57) ABSTRACT

Provided is a cosmetic composition including ceramides and a sphingolipid. A composition including two or more different ceramides and a sphingolipid, according to an embodiment, has the activity of increasing a ceramide content in the skin, increasing the expression level of aquaporin 3, increasing the expression level of fillaggrin, increasing the expression level of loricrin, increasing the expression level of involucrin, and increasing the skin thickness, and thus can be effectively used for improving skin conditions.

5 Claims, 18 Drawing Sheets

COSMETIC COMPOSITION COMPRISING CERAMIDES AND SPHINGOLIPID

CROSS-REFERENCE TO RELATED APPLICATION

This application claims the benefit of Korean Patent Application No. 10-2022-0135792, filed on Oct. 20, 2022, in the Korean Intellectual Property Office, the disclosure of which is incorporated herein in its entirety by reference.

BACKGROUND

1. Field

The present disclosure relates to a cosmetic composition including ceramides and a sphingolipid.

2. Description of the Related Art

Ceramides are mainly produced by the hydrolysis of sphingomyelin, a type of phospholipids constituting cell membranes, by the action of the enzyme sphingomyelinase, are major polar lipid components of the stratum corneum, which account for about 50% of the stratum corneum, and are components that form a lipid bilayer with moisture to have constant humidity and barrier functions.

Sphingolipids are a type of lipids and known to exist in the cell membranes of almost all living organisms, and collectively refer to various derivatives including sphingoid bases as a backbone (sphingosine, sphinganine, or phytosphingosine), fatty acids, and head groups.

The surface of human skin is protected by corneocytes, which are degenerated keratinocytes that have differentiated and matured from the basal layer, and these corneocytes maintain the elasticity of the skin by binding to the double-chained lamellar structure of ceramides, which are abundantly present in the stratum corneum. That is, ceramides are arranged in parallel as a layered structure, and moisture is filled and maintained therebetween, so that the layered structure exhibits an overall barrier function.

Also, from the fact that abnormal ceramide levels (sphingolipid deficiency) are commonly observed in atopic eczema, dermatitis, and psoriasis, it can be seen that sphingolipids are very closely related to skin health.

Meanwhile, the skin barrier can be damaged due to various causes, such as skin stress due to various stresses or environmental pollution, frequent face washing and natural skin aging, and loss-of-function mutations in the filaggrin gene (FLG).

When the skin barrier is damaged, chemicals and microorganisms can easily penetrate into the skin and cause dermatitis, dry skin, and the like.

Thus, to preemptively protect, strengthen or improve the skin barrier before damage thereto, compositions or functional cosmetics for strengthening the skin barrier or skin moisturizing have recently attracted attention. To strengthen the skin barrier or improve the function, for example, a humectant having the property of absorbing moisture or an occlusive moisturizer for preventing moisture evaporation is used. Once the skin barrier is damaged, the skin barrier does not recover well even when a moisturizer is applied, which requires the prescription of a steroid therapeutic agent. However, when a steroid therapeutic agent is used for a long period of time, dermal atrophy may occur or capillary vessels may expand, and it may rather cause a deterioration in skin barrier function. Thus, it is important to protect or strengthen the skin barrier or improve skin barrier function before damage to the skin barrier.

Therefore, the inventors of the present disclosure have made efforts to overcome the problems of previously known moisturizing agents or steroid therapeutic agents, and as a result, confirmed that a mixture of ceramides and a sphingolipid are effective in skin improvement, thus completing the present disclosure.

SUMMARY

Provided is a cosmetic composition including: two or more different ceramides; and a sphingolipid.

Another aspect is to provide a dermatologic composition for external application, including: two or more different ceramides; and a sphingolipid.

According to an aspect of an embodiment, a cosmetic composition includes: two or more different ceramides; and a sphingolipid.

The term "ceramide" is used interchangeably with N-acylsphingosine, and may include all compounds consisting of sphingosine and fatty acids. Specific examples of the ceramides may include natural ceramides, synthetic ceramides, pseudo-ceramides, or a derivative thereof. Natural ceramides are ceramides that exist in nature, and may be ceramides extracted from animals, plants, and microorganisms.

Pseudo-ceramides are a generic term for compounds having a double-chained lamellar structure of a natural ceramide. The pseudo-ceramide may include, for example, one selected from the group consisting of 1,3-bis(N-2-(hydroxyethyl)palmitoylamino)-2-hydroxypropane, 1,3-bis(N-2-(hydroxyethyl)lauroyl amino)-2-hydroxypropane, 1,3-bis(N-2-(hydroxyethyl)isostearoylamino)-2-hydroxypropane, 1,3-bis(N-2-(hydroxylethyl)stearoylamino)-2-hydroxypropane, and a mixture thereof.

Each of the two different ceramides may be any one selected from the group consisting of ceramide 1 (ceramide EOP), ceramide 2 (ceramide NS), ceramide 3 (ceramide NP), ceramide 4 (ceramide EOH), ceramide 5 (ceramide AS), ceramide 6 (ceramide AP), ceramide 7 (ceramide AH), ceramide 8 (ceramide NH), ceramide 9 (ceramide EOS), ceramide 10 (ceramide Nds), ceramide 11 (ceramide Ads), and ceramide 12 (ceramide EOds).

In one embodiment, the two different ceramides may refer to a ceramide mixture in which two different ceramides selected from the above-described ceramides are combined.

In one embodiment, the two different ceramides may be ceramide 3 (ceramide NP) and ceramide 6 (ceramide AP), respectively.

The sphingolipid may be any one selected from the group consisting of sphingosine, dihydrosphingosine, dehydrosphingosine, phytosphingosine, dehydrophytosphingosine, acetylphytosphingosine, tetraacetylphytosphingosine, and sphinganine.

In one embodiment, the two different ceramides and the sphingolipid may be mixed in a weight ratio of 1-10:1-10:1-10. Specifically, the ceramide 3 (ceramide NP), the ceramide 6 (ceramide AP), and the sphingolipid may be mixed in a weight ratio of 1-10:1-10:1-10. For example, the ceramide 3 (ceramide NP), the ceramide 6 (ceramide AP), and the sphingolipid may be mixed in a weight ratio of 1-8:1-8:1-8, 1-6:1-6:1-6, 1-5:1-5:1-5, 1-3:1-3:1-3, 1-10:1-5:1-5, 1-8:1-5:1-5, 1-8:1-3:1-3, 1-5:1-2:1-2, 1-5:1-1.8:1-1.8, 1-5:1-1.5:1-1.5, 1-3:1-1.8:1-1.8, 1-3:1-1.5:1-1.5, 1-2.8:1-1.8:1-1.8, 1-2.8:1-1.5:1-1.5, 1-2.5:1-1.8:1-1.8, 1-2.5:1-1.5:1-1.5, 1-2.3:1-1.8:1-1.8, 1-2.3:1-1.5:1-1.5, 1-5:1:1, 1-3:1:1, or 2:1:

1. In one embodiment, the ceramide 3 (ceramide NP), the ceramide 6 (ceramide AP), and the sphingolipid may be mixed in a weight ratio of 1-3:1-1.5:1-1.5 to have the strongest skin condition improvement effect.

In one embodiment, the composition may further include ceramide 1 (ceramide EOP). Specifically, in addition to ceramide 3 (ceramide NP), ceramide 6 (ceramide AP), and the sphingolipid, the composition may further include ceramide 1 (ceramide EOP).

In one embodiment, each of the two different ceramides may be included in an amount of 0.001 wt % to 10 wt % with respect to the total weight of the composition. For example, each ceramide may be included in an amount of 0.001 wt % to 8 wt %, 0.001 wt % to 6 wt %, 0.001 wt % to 4 wt %, 0.001 wt % to 3 wt %, 0.001 wt % to 2 wt %, 0.01 wt % to 10 wt %, 0.01 wt % to 8 wt %, 0.01 wt % to 6 wt %, 0.01 wt % to 4 wt %, 0.01 wt % to 3 wt %, 0.01 wt % to 2 wt %, 0.5 wt % to 10 wt %, 0.5 wt % to 8 wt %, 0.5 wt % to 6 wt %, 0.5 wt % to 4 wt %, 0.5 wt % to 3 wt %, 0.5 wt % to 2 wt %, 0.1 wt % to 10 wt %, 0.1 wt % to 8 wt %, 0.1 wt % to 6 wt %, 0.1 wt % to 4 wt %, 0.1 wt % to 3 wt %, or 0.1 wt % to 2 wt %.

In one embodiment, the sphingolipid may be included in an amount of 0.01 wt % to 5 wt % with respect to the total weight of the composition. For example, the sphingolipid may be included in an amount of 0.01 wt % to 4 wt %, 0.01 wt % to 3 wt %, 0.01 wt % to 2 wt %, 0.05 wt % to 5 wt %, 0.05 wt % to 4 wt %, 0.05 wt % to 3 wt %, 0.05 wt % to 2 wt %, 0.1 wt % to 5 wt %, 0.1 wt % to 4 wt %, 0.1 wt % to 3 wt %, 0.1 wt % to 2 wt %, 0.5 wt % to 5 wt %, 0.5 wt % to 4 wt %, 0.5 wt % to 3 wt %, or 0.5 wt % to 2 wt %.

In one embodiment, ceramide 1 (ceramide EOP) may be included in an amount of 0.0001 wt % to 0.5 wt % with respect to the total weight of the composition. For example, ceramide 1 (ceramide EOP) may be included in an amount of 0.0001 wt % to 0.3 wt %, 0.0001 wt % to 0.1 wt %, 0.0001 wt % to 0.05 wt %, 0.0001 wt % to 0.01 wt %, 0.0005 wt % to 0.5 wt %, 0.0005 wt % to 0.3 wt %, 0.0005 wt % to 0.1 wt %, 0.0005 wt % to 0.05 wt %, 0.0005 wt % to 0.01 wt %, 0.001 wt % to 0.5 wt %, 0.001 wt % to 0.3 wt %, 0.001 wt % to 0.1 wt %, 0.001 wt % to 0.05 wt %, or 0.001 wt % to 0.01 wt %.

Another aspect provides a dermatologic composition for external application including: two or more different ceramides; and a sphingolipid.

The ceramides and the sphingolipid are the same as described above.

In one embodiment, the cosmetic composition or the dermatologic composition for external application may be for improving skin conditions.

In one embodiment, the improvement of the skin conditions may be skin moisturizing, strengthening the skin barrier, skin aging improvement, skin wrinkle improvement, skin elasticity improvement, skin regeneration, or skin whitening.

The term "strengthening the skin barrier" as used herein comprehensively means the function of improving or protecting the skin barrier. In the skin barrier, the stratum corneum, which is the outermost layer of the epidermis, mainly consists of non-nucleated flat corneocytes. The strengthening of the skin barrier may refer to any action that enhances the function of the skin barrier to prevent moisture and nutrient loss. The strengthening of the skin barrier may refer to any action of: alleviating psoriasis, contact dermatitis, eczematous dermatitis, actinic dermatitis, seborrheic dermatitis, dermatitis herpetiformis, lichen planus, lichen scleroderma, pyoderma gangrenosum, pemphigus, epidermolysis bullosa, systemic sclerosis or leprosy that is a skin disease caused by a deterioration in the skin barrier function; or improving damaged skin barrier function.

The term "skin aging" as used herein may refer to tangible and intangible changes that appear on the skin with aging. For example, skin aging may include decreased epidermal thickness, a reduction in the number of dermal cells or blood vessels, reduced ability to repair DNA damage, decreased cell turnover, delayed wound healing, reduced skin barrier functions, reduced water retention in the epidermis, decreased sweat and sebum secretion, decreased vitamin D production, decreased physical damage defense, decreased chemical removal ability, decreased immune responses, decreased sensory function, and decreased temperature control.

The skin aging includes not only early aging symptoms caused by external stimuli such as UV, air pollution, cigarette smoke, and chemicals, but also natural aging occurring due to a reduction in skin cell proliferation with aging, and may include all of wrinkles, loss of elasticity, saggy skin, dryness, and the like. In addition, wrinkles may include wrinkles caused by changes in the components constituting the skin tissue by stimulation due to changes in internal or external factors.

The aging may be photoaging. The term "photoaging" as used herein may be a phenomenon caused by external environmental factors, for example, ultraviolet rays.

Ultraviolet rays cause damage to biological components, such as activation of proteolytic enzymes, chain cleavage of matrix proteins, and abnormal cross-linking, and repetition of these mechanisms can lead to apparent skin aging.

The term "wrinkles" as used herein may refer to a state in which elasticity of the skin is reduced. For example, wrinkles may be folding of the skin. Pigmentation may refer to the case in which the amount of a pigment in the body is abnormal or a state in which there is an abnormality in a place where the pigment appears, and may be, for example, melisma, freckles, and the like. The term "preventing or improving skin wrinkles" as used herein may refer to any action that prevents or improves wrinkles by inhibiting the expression of factors related to wrinkles, or increases the total amount of collagen.

The term "skin whitening" as used herein may refer to brightening of skin tone by inhibiting the synthesis of melanin pigment, and improvement of skin hyperpigmentation such as melisma or freckles caused by ultraviolet rays, hormones, or heredity.

The cosmetic composition may be prepared in any formulation commonly prepared in the technical field to which the present disclosure pertains. For example, the cosmetic composition may be formulated into, but is not limited to, a softening lotion, a nutrient lotion, an emulsion, a lotion, a cream, a paste, a gel, a pack, a solution, a suspension, oil, a wax, a pack, a powder, a foundation, a spray, a hair product, or a surfactant-containing cleansing. More specifically, the cosmetic composition may be prepared as a formulation such as a skin lotion, a skin softener, a skin toner, a nourishing cream, a massage cream, a milk lotion, a powder, an essence, an eye cream, a sun lotion, a sun cream, a makeup primer, a makeup base, a BB cream, a powder foundation, an emulsion foundation, a cleansing cream, a cleansing foam, cleansing water, a soap, a pack, a stick-type product, a balm-type product, a spray, or a powder.

The cosmetic composition may further include any common cosmetic ingredient which may be selected from additional ingredients commonly used in cosmetics, for example, a thickener, a dispersant, a fragrance, a filler, a preservative, a neutralizer, a sweetener, vitamins, a free-radical scavenger, a sequestering agent, a functional ingredient, and a mixture thereof. Those of ordinary skill in the art may select any additional ingredient and/or the amount thereof, so that the advantageous properties of the composition according to the present specification are not adversely or substantially affected by the expected addition.

In one embodiment, the cosmetic composition may have one formulation selected from the group consisting of a skin toner, a lotion, a cream, an essence, a pack, a foundation, a soap, a cleansing product, a body moisturizer, a hair product, and a cleaning agent.

In one embodiment, the cosmetic composition may further include at least one selected from the group consisting of a stabilizer, a surfactant, oil, a chelating agent, a polyol, a preservative, and a thickener.

The cosmetic composition may further include additional ingredients commonly used in cosmetics. Those of ordinary skill in the art may select any additional ingredient and/or the amount thereof, so that the advantageous properties of the composition according to the present specification are not adversely or substantially affected by the expected addition.

In the present specification, the dermatologic agent for external application may be a cream, a gel, an ointment, a skin emulsifier, a skin suspension, a patch for transdermal delivery, a drug-containing bandage, a lotion, or a combination thereof. The dermatologic agent for external application may be, if needed, appropriately mixed with an ingredient, which is used in general dermatologic agents for external application, such as cosmetics or medicines, for example, an aqueous component, an oily component, a powder component, alcohols, a moisturizer, a thickener, an ultraviolet absorber, a whitening agent, a preservative, an antioxidant, a surfactant, a fragrance, a colorant, various skin nutrients, or a combination thereof. In the dermatologic agent for external application, metal chelating agents such as disodium edetate, trisodium edetate, sodium citrate, sodium polyphosphate, sodium metaphosphate, and gluconic acid, drugs such as caffeine, tannin, verapamil, a licorice extract, glabridin, a hot water extract of calin fruit, various herbal medicines, tocopherol acetate, glycyrrhizic acid, tranexamic acid, and derivatives or salts thereof, vitamin C, magnesium ascorbyl phosphate, ascorbic acid glucoside, albutin, kojic acid, sugars such as glucose, fructose, and trehalose, and the like may also be appropriately mixed.

The cosmetic composition or the dermatologic agent for external application may be used via single or double application, or may be used via double application in combination with other cosmetic compositions other than the present disclosure. In addition, the cosmetic composition according to the present disclosure may be used according to a commonly used method, and the number of times of use may vary according to the skin condition or preference of a user.

MODE OF DISCLOSURE

Figure 1:
FIG. 1 illustrates images showing the effect of a composition according to an embodiment on the expression level of aquaporin 3 in the skin.
Figure 2:
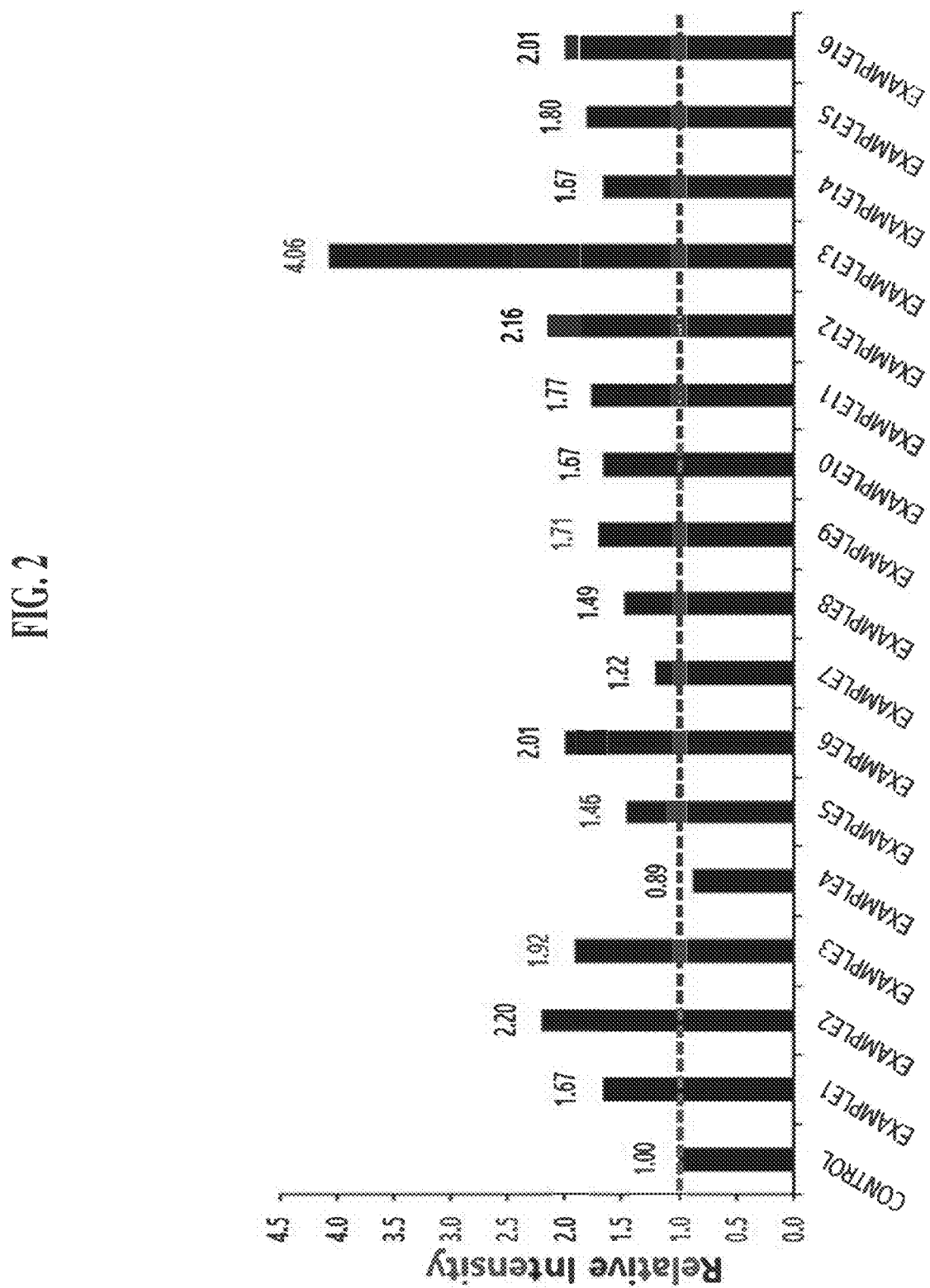
FIG. 2 is a graph showing the effect of a composition according to an embodiment on the expression level of aquaporin 3 in the skin.
Figure 3:
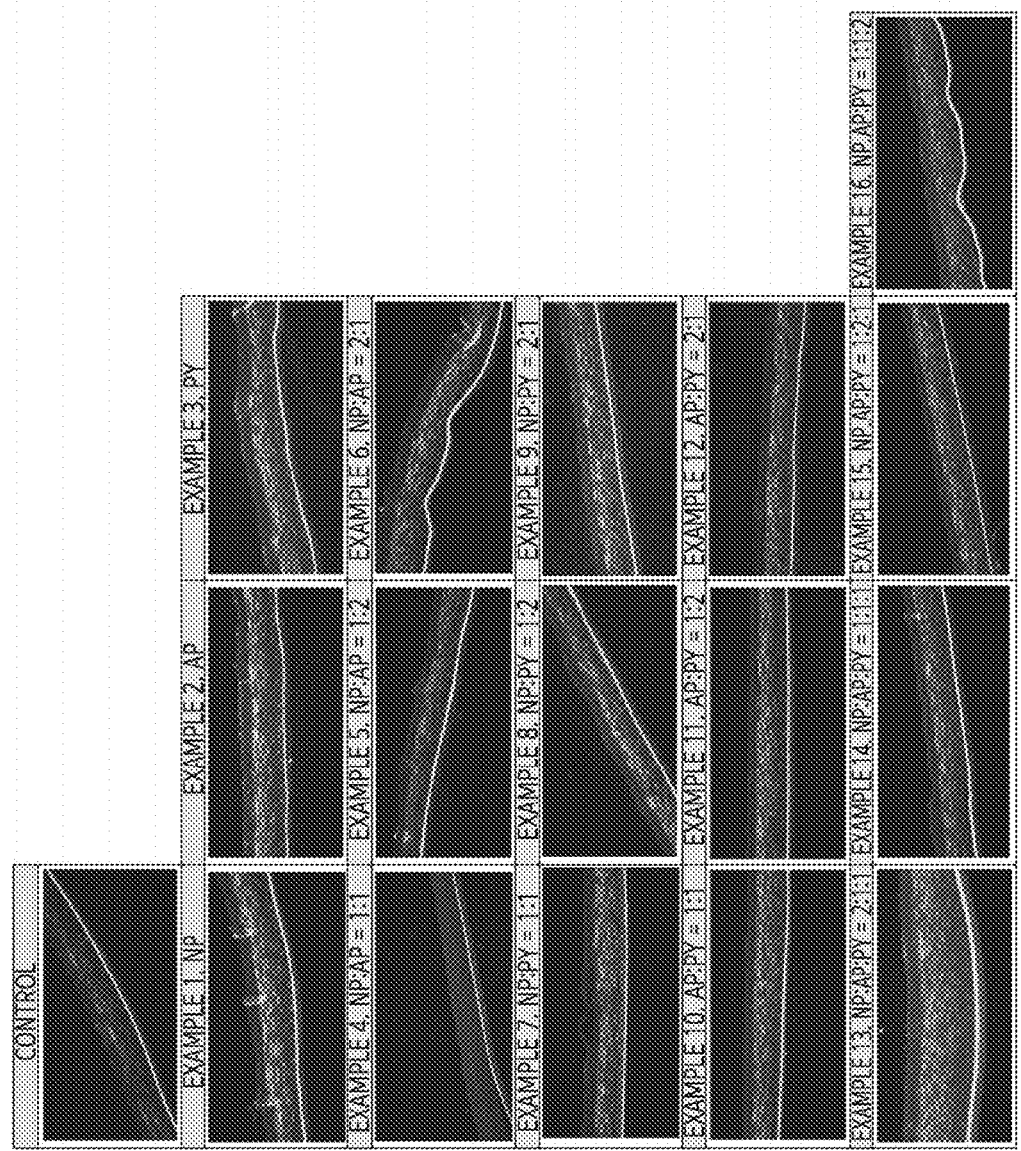
FIG. 3 illustrates images showing the effect of a composition according to an embodiment on the expression level of filaggrin in the skin.
Figure 4:
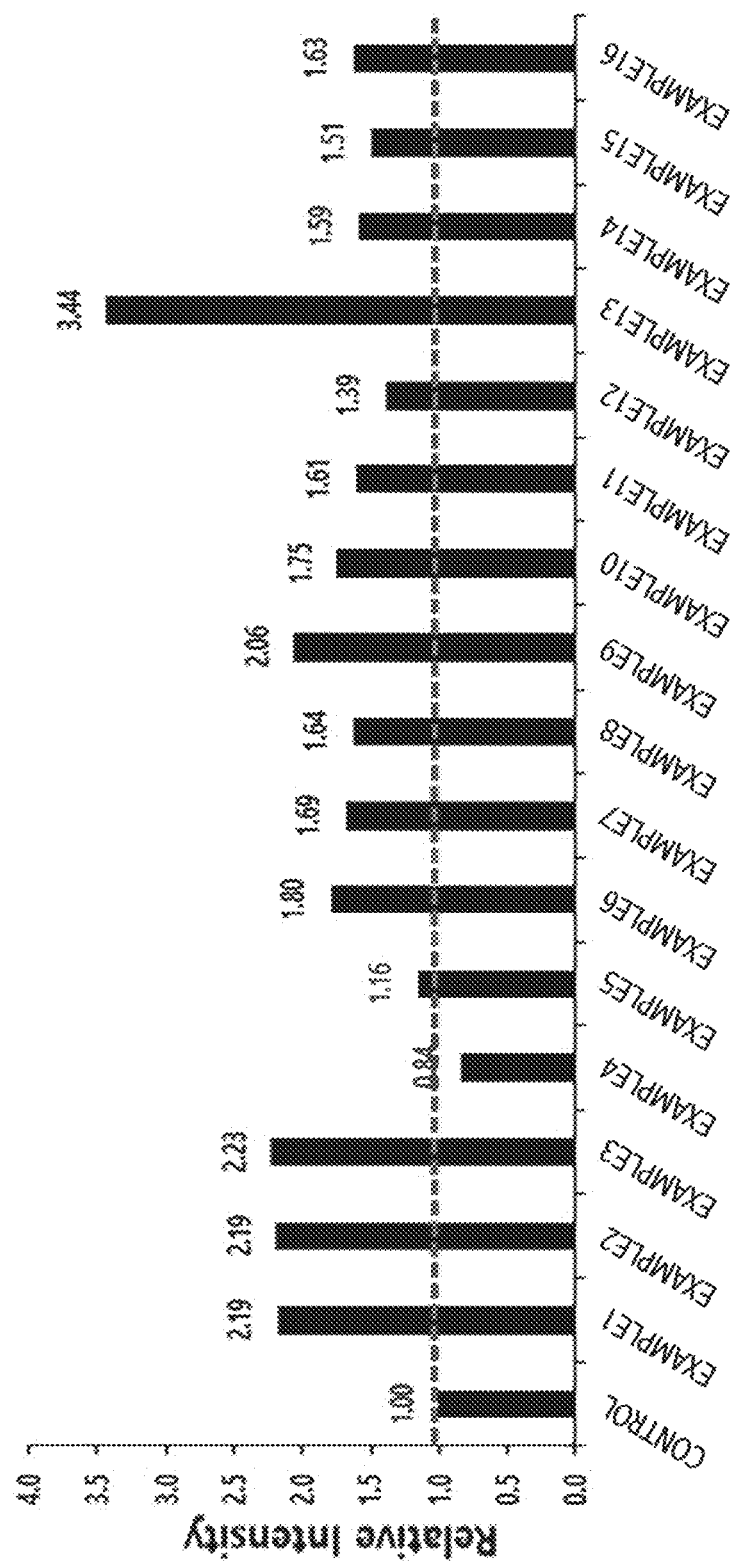
FIG. 4 is a graph showing the effect of a composition according to an embodiment on the expression level of filaggrin in the skin.

Hereinafter, exemplary embodiments will be described to aid in understanding of the present disclosure. However, the following examples are provided only for easier understanding of the present disclosure and are not intended to limit the scope of the present disclosure. Various modifications can be made in embodiments, and thus embodiments are not limited to the following examples and can be implemented in various forms.

Examples 1-21. Preparation of Ceramide-Mixed Cream

Ingredients shown in tables 1 to 3 below were mixed to prepare creams of Examples 1 to 21.

Each of ceramide NP, ceramide AP, and phytosphingosine was added (Examples 1 to 3), ceramide NP and ceramide AP were added at different ratios (Examples 4 to 6), ceramide NP and phytosphingosine were added at different ratios (Examples 7 to 9), ceramide AP and phytosphingosine were added at different ratios (Examples 10 to 12), ceramide NP, ceramide AP, and phytosphingosine were added at different ratios (Examples 13 to 16), and ceramide NP, ceramide AP, and phytosphingosine were added at different ratios and ceramide EOP was further added (Examples 17 to 21).

Hereinafter, ceramide NP, ceramide AP, phytosphingosine, and ceramide EOP were denoted as NP, AP, PY, and EOP, respectively.

TABLE 1

| | | Control | Single ingredient | | | 1:1 | 1:2 | 2:1 |
| | | | | | | NP + AP | | |
| No. | INCI name | Control | Cream NP Example 1 | AP Example 2 | PY Example 3 | Example 4 | Example 5 | Example 6 |
| --- | --- | --- | --- | --- | --- | --- | --- | --- |
| 1 | Water | 53.33 | 51.33 | 51.33 | 51.33 | 51.33 | 51.34 | 51.32 |
| 2 | Disodium EDTA | 0.02 | 0.02 | 0.02 | 0.02 | 0.02 | 0.02 | 0.02 |
| 3 | 1,2-Hexanediol | 1.00 | 1.00 | 1.00 | 1.00 | 1.00 | 1.00 | 1.00 |
| 4 | Glycerin | 3.00 | 3.00 | 3.00 | 3.00 | 3.00 | 3.00 | 3.00 |
| 5 | Butylene glycol | 5.00 | 5.00 | 5.00 | 5.00 | 5.00 | 5.00 | 5.00 |
| 6 | Carbomer (1%) | 17.00 | 17.00 | 17.00 | 17.00 | 17.00 | 17.00 | 17.00 |
| 7 | Ammonium Acryloyldimethyltaurate/VP Copolymer | 0.05 | 0.05 | 0.05 | 0.05 | 0.05 | 0.05 | 0.05 |
| 8 | Ceramide NP | | 2.00 | | | 1.00 | 0.67 | 1.33 |
| 9 | Ceramide AP | | | 2.00 | | 1.00 | 1.33 | 0.67 |
| 10 | Ceramide EOP | | | | | | | |
| 11 | Phytosphingosine | | | | 2.00 | | | |
| 12 | Glyceryl stearate, PEG-100 Stearate | 2.00 | 2.00 | 2.00 | 2.00 | 2.00 | 2.00 | 2.00 |
| 13 | Glyceryl monostearate | 1.00 | 1.00 | 1.00 | 1.00 | 1.00 | 1.00 | 1.00 |
| 14 | Cetearyl alcohol | 3.00 | 3.00 | 3.00 | 3.00 | 3.00 | 3.00 | 3.00 |
| 15 | Stearic acid | 0.90 | 0.90 | 0.90 | 0.90 | 0.90 | 0.90 | 0.90 |
| 16 | Hydrogenated polydecene | 5.00 | 5.00 | 5.00 | 5.00 | 5.00 | 5.00 | 5.00 |
| 17 | Cetyl Ethylhexanoate | 2.00 | 2.00 | 2.00 | 2.00 | 2.00 | 2.00 | 2.00 |
| 18 | Caprylic/capric triglycerides | 2.00 | 2.00 | 2.00 | 2.00 | 2.00 | 2.00 | 2.00 |
| 19 | Dimethicone | 3.00 | 3.00 | 3.00 | 3.00 | 3.00 | 3.00 | 3.00 |
| 20 | Arginine (10%) | 1.70 | 1.70 | 1.70 | 1.70 | 1.70 | 1.70 | 1.70 |

TABLE 2

| | | 1:1 | 1:2 | 2:1 | 1:1 | 1:2 | 2:1 | 2:1:1 | 1:1:1 | 1:2:1 | 1:1:2 |
| | | NP + PY | | | AP + PY | | | NP + AP + PY | | | |
| No. | INCI name | Example 7 | Example 8 | Example 9 | Example 10 | Example 11 | Example 12 | Example 13 | Example 14 | Example 15 | Example 16 |
| --- | --- | --- | --- | --- | --- | --- | --- | --- | --- | --- | --- |
| 1 | Water | 51.33 | 51.34 | 51.32 | 51.33 | 51.33 | 51.33 | 51.33 | 51.33 | 51.33 | 51.33 |
| 2 | Disodium EDTA | 0.02 | 0.02 | 0.02 | 0.02 | 0.02 | 0.02 | 0.02 | 0.02 | 0.02 | 0.02 |
| 3 | 1,2-Hexanediol | 1.00 | 1.00 | 1.00 | 1.00 | 1.00 | 1.00 | 1.00 | 1.00 | 1.00 | 1.00 |
| 4 | Glycerin | 3.00 | 3.00 | 3.00 | 3.00 | 3.00 | 3.00 | 3.00 | 3.00 | 3.00 | 3.00 |
| 5 | Butylene glycol | 5.00 | 5.00 | 5.00 | 5.00 | 5.00 | 5.00 | 5.00 | 5.00 | 5.00 | 5.00 |
| 6 | Carbomer (1%) | 17.00 | 17.00 | 17.00 | 17.00 | 17.00 | 17.00 | 17.00 | 17.00 | 17.00 | 17.00 |
| 7 | Ammonium Acryloyldimethyltaurate/VP Copolymer | 0.05 | 0.05 | 0.05 | 0.05 | 0.05 | 0.05 | 0.05 | 0.05 | 0.05 | 0.05 |
| 8 | Ceramide NP | 1.00 | 0.67 | 1.33 | | | | 1.00 | 0.67 | 0.50 | 0.50 |
| 9 | Ceramide AP | | | | 1.00 | 0.67 | 1.33 | 0.50 | 0.67 | 1.00 | 0.50 |
| 10 | Ceramide EOP | | | | | | | | | | |
| 11 | Phytosphingosine | 1.00 | 1.33 | 0.67 | 1.00 | 1.33 | 0.67 | 0.50 | 0.67 | 0.50 | 1.00 |
| 12 | Glyceryl stearate, PEG-100 Stearate | 2.00 | 2.00 | 2.00 | 2.00 | 2.00 | 2.00 | 2.00 | 2.00 | 2.00 | 2.00 |
| 13 | Glyceryl monostearate | 1.00 | 1.00 | 1.00 | 1.00 | 1.00 | 1.00 | 1.00 | 1.00 | 1.00 | 1.00 |
| 14 | Cetearyl alcohol | 3.00 | 3.00 | 3.00 | 3.00 | 3.00 | 3.00 | 3.00 | 3.00 | 3.00 | 3.00 |
| 15 | Stearic acid | 0.90 | 0.90 | 0.90 | 0.90 | 0.90 | 0.90 | 0.90 | 0.90 | 0.90 | 0.90 |
| 16 | Hydrogenated polydecene | 5.00 | 5.00 | 5.00 | 5.00 | 5.00 | 5.00 | 5.00 | 5.00 | 5.00 | 5.00 |
| 17 | Cetyl Ethylhexanoate | 2.00 | 2.00 | 2.00 | 2.00 | 2.00 | 2.00 | 2.00 | 2.00 | 2.00 | 2.00 |
| 18 | Caprylic/capric Triglycerides | 2.00 | 2.00 | 2.00 | 2.00 | 2.00 | 2.00 | 2.00 | 2.00 | 2.00 | 2.00 |
| 19 | Dimethicone | 3.00 | 3.00 | 3.00 | 3.00 | 3.00 | 3.00 | 3.00 | 3.00 | 3.00 | 3.00 |
| 20 | Arginine (10%) | 1.70 | 1.70 | 1.70 | 1.70 | 1.70 | 1.70 | 1.70 | 1.70 | 1.70 | 1.70 |

TABLE 3

| | | 2:1:1 + EOP | | | | |
|---|---|---|---|---|---|---|
| | | EOP 0.001 | EOP 0.01 | 1:1:1 | 1:2:1 | 1:1:2 |
| | | | | NP + AP + PY + EOP | | |
| No. | INCI name | Example 17 | Example 18 | Example 19 | Example 20 | Example 21 |
| 1 | Water | 51.329 | 51.32 | 51.32 | 51.32 | 51.32 |
| 2 | Disodium EDTA | 0.02 | 0.02 | 0.02 | 0.02 | 0.02 |
| 3 | 1,2-Hexanediol | 1.00 | 1.00 | 1.00 | 1.00 | 1.00 |
| 4 | Glycerin | 3.00 | 3.00 | 3.00 | 3.00 | 3.00 |
| 5 | Butylene glycol | 5.00 | 5.00 | 5.00 | 5.00 | 5.00 |
| 6 | Carbomer (1%) | 17.00 | 17.00 | 17.00 | 17.00 | 17.00 |
| 7 | Ammonium Acryloyldimethyltaurate/VP Copolymer | 0.05 | 0.05 | 0.05 | 0.05 | 0.05 |
| 8 | Ceramide NP | 1.00 | 1.00 | 0.67 | 0.50 | 0.50 |
| 9 | Ceramide AP | 0.50 | 0.50 | 0.67 | 1.00 | 0.50 |
| 10 | Ceramide EOP | 0.001 | 0.010 | 0.010 | 0.010 | 0.010 |
| 11 | Phytosphingosine | 0.50 | 0.50 | 0.67 | 0.50 | 1.00 |
| 12 | Glyceryl stearate, PEG-100 Stearate | 2.00 | 2.00 | 2.00 | 2.00 | 2.00 |
| 13 | Glyceryl monostearate | 1.00 | 1.00 | 1.00 | 1.00 | 1.00 |
| 14 | Cetearyl alcohol | 3.00 | 3.00 | 3.00 | 3.00 | 3.00 |
| 15 | Stearic acid | 0.90 | 0.90 | 0.90 | 0.90 | 0.90 |
| 16 | Hydrogenated polydecene | 5.00 | 5.00 | 5.00 | 5.00 | 5.00 |
| 17 | Cetyl Ethylhexanoate | 2.00 | 2.00 | 2.00 | 2.00 | 2.00 |
| 18 | Caprylic/capric triglycerides | 2.00 | 2.00 | 2.00 | 2.00 | 2.00 |
| 19 | Dimethicone | 3.00 | 3.00 | 3.00 | 3.00 | 3.00 |
| 20 | Arginine (10%) | 1.70 | 1.70 | 1.70 | 1.70 | 1.70 |

Experimental Example 1. Confirmation of Expression of Skin Moisturizing Factors According to Ceramide Ratio To verify the difference in skin moisturizing according to a ceramide content ratio, each of the creams of Examples 1 to 16 was applied to 3D skin model (EPI-201) manufactured by MatTek, and then the expression of aquaporin 3 and filaggrin was examined.

Aquaporin 3 expression and filaggrin expression were analyzed by immunofluorescence. Specifically, after the 3D skin model was treated with each of the creams of Examples 1 to 16, the 3D skin model was incubated for 48 hours, and then each cream was washed out with PBS. The 3D skin model was put into a cassette and fixed with 10% formalin, and then made into a paraffin block through dehydration, transparency, penetration, and embedding processes. For deparaffinization, slides were prepared by sectioning to 3 μm, and then paraffin was melted in a dry oven at 60° C. for 30 minutes. Then, the slides were treated with xylene for 15 minutes, 100% ethanol for 5 minutes, 95% ethanol for 5 minutes, and 70% ethanol for 5 minutes, and washed with tap water. Antigen retrieval was carried out by boiling for 10 minutes in citrate buffer in a cooker, followed by cooling in running water. After treatment with 0.5% Triton X-100 for 15 minutes, the slides were washed three times with PBS buffer for 5 minutes. The slides were blocked with 1% BSA at room temperature for 1 hour, followed by washing three times with PBS each for 5 minutes. The primary antibody was diluted at a certain ratio and left overnight at 4° C., and citrate buffer was used as the retrieval antigen. After being washed with PBS, the slides were reacted with FITC 488 antibody at room temperature for 1 hour, followed by washing three times with PBS. After DAPI mounting, the slides were observed using a fluorescence microscope, and the results thereof are illustrated in FIGS. 1 to 4.

As a result, as illustrated in FIGS. 1 to 4, the moisturizing factors were highly expressed in creams according to embodiments as compared to a control, and in particular, the highest expression thereof was shown in Example 13. These results indicate that the composition according to an embodiment has the effect of improving skin conditions, e.g., skin moisturizing.

Experimental Example 2. Confirmation of Skin Barrier Thickness According to Ceramide Ratio To verify the difference in skin barrier thickness according to a ceramide content ratio, each of the creams of Examples 1 to 16 was applied to under-developed 3D skin model, and then changes in the skin barrier thickness were examined.

The skin barrier thickness was identified with H&E staining. Specifically, as in Experimental Example 1, a paraffin block was made, and then, for deparaffinization, slides were prepared by sectioning to 3 μm, and thereafter, paraffin was melted in a dry oven at 60° C. for 30 minutes. The slides were immersed in xylene, 100% ethanol, 85% ethanol, 70% ethanol, and water in this order, and then stained with hematoxylin for 10 minutes. After being washed in running water, the slides were sequentially immersed in 1% HCl and 1% ammonia. After staining with eosin for 2 minutes, dehydration was carried out, followed by mounting, and the microscopic observation results are illustrated in FIGS. 5 and 6.

Figure 5:
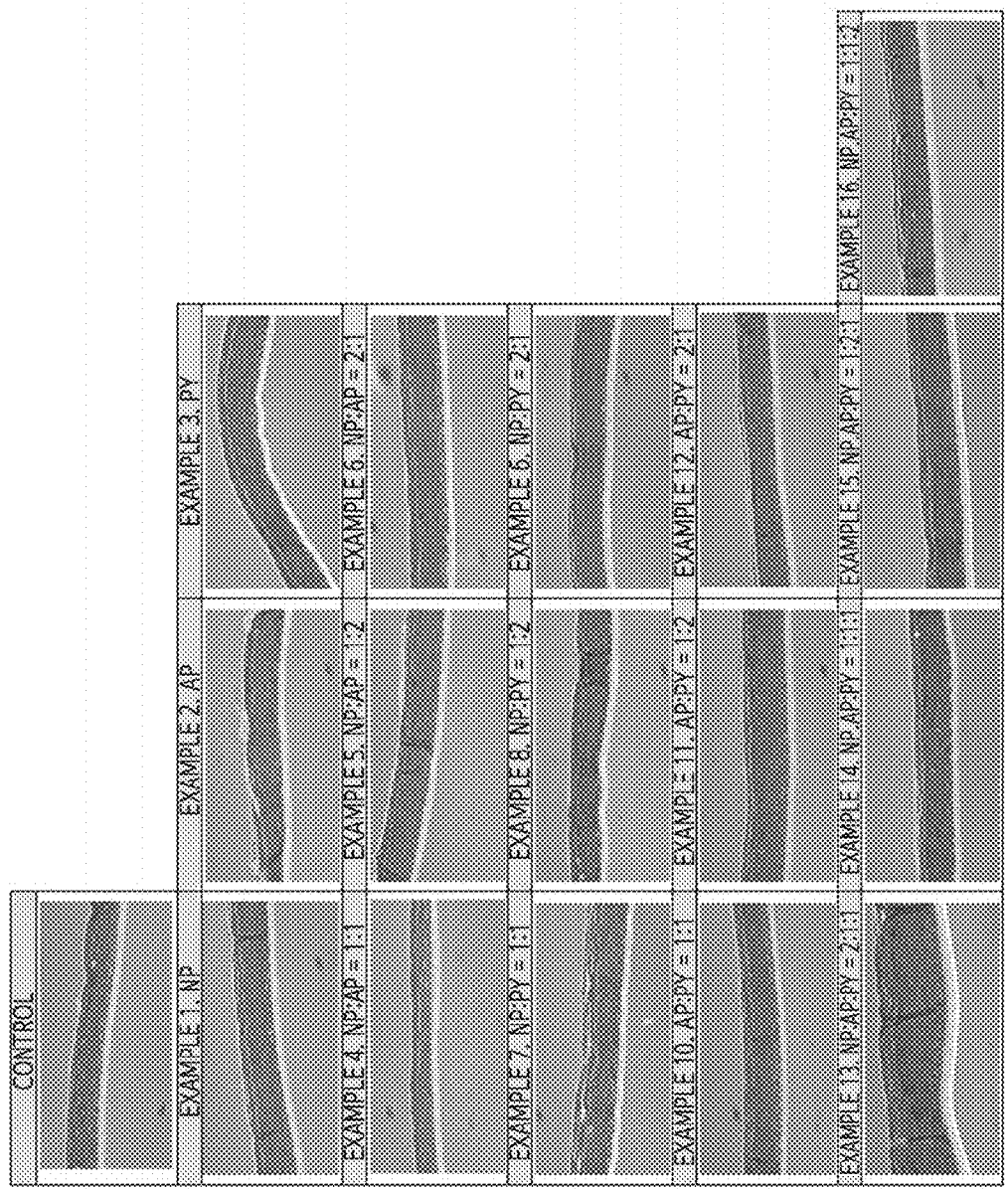
FIG. 5 illustrates images showing the effect of a composition according to an embodiment on the thickness of the skin.
Figure 6:
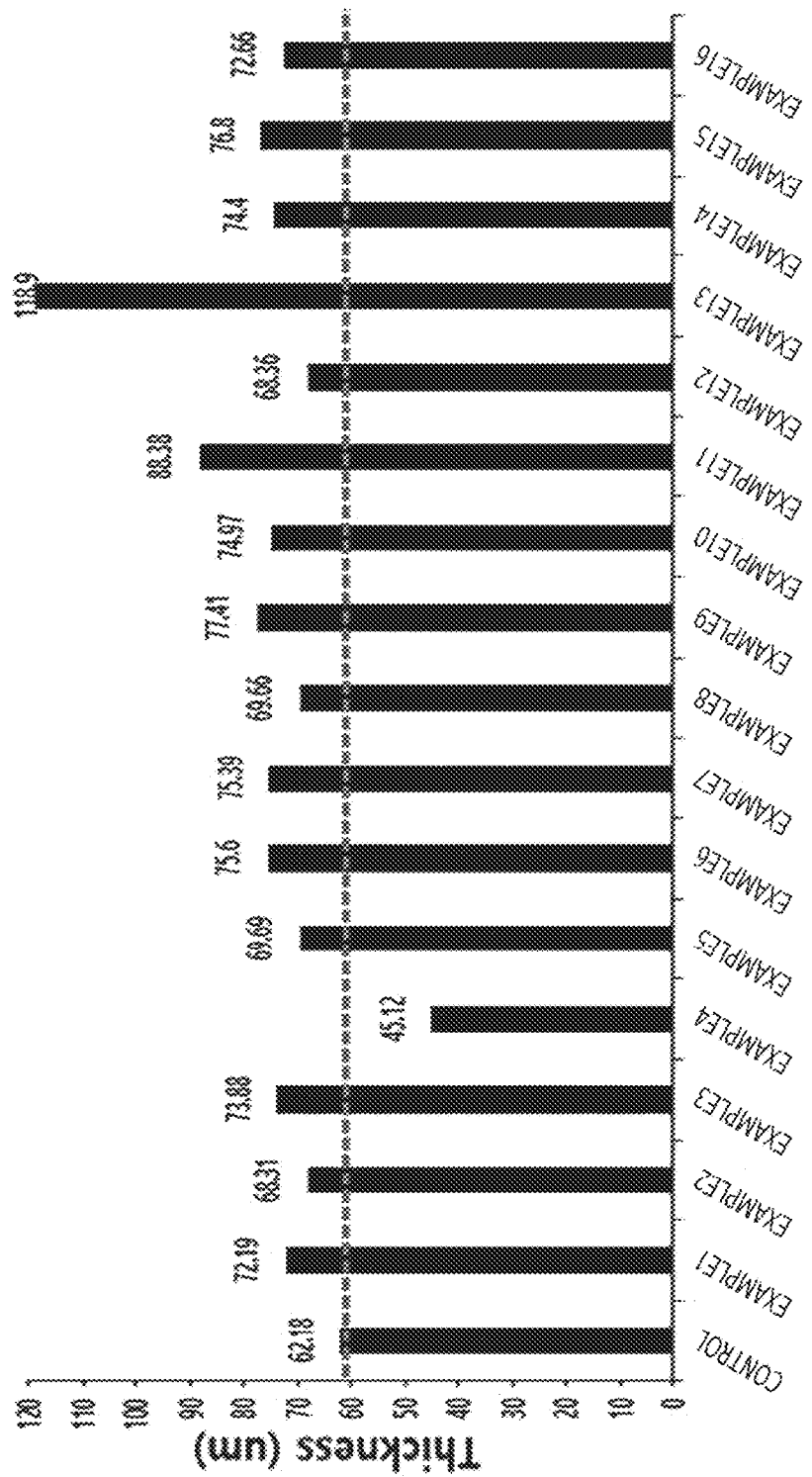
FIG. 6 is a graph showing the effect of a composition according to an embodiment on the thickness of the skin.
Figure 7:
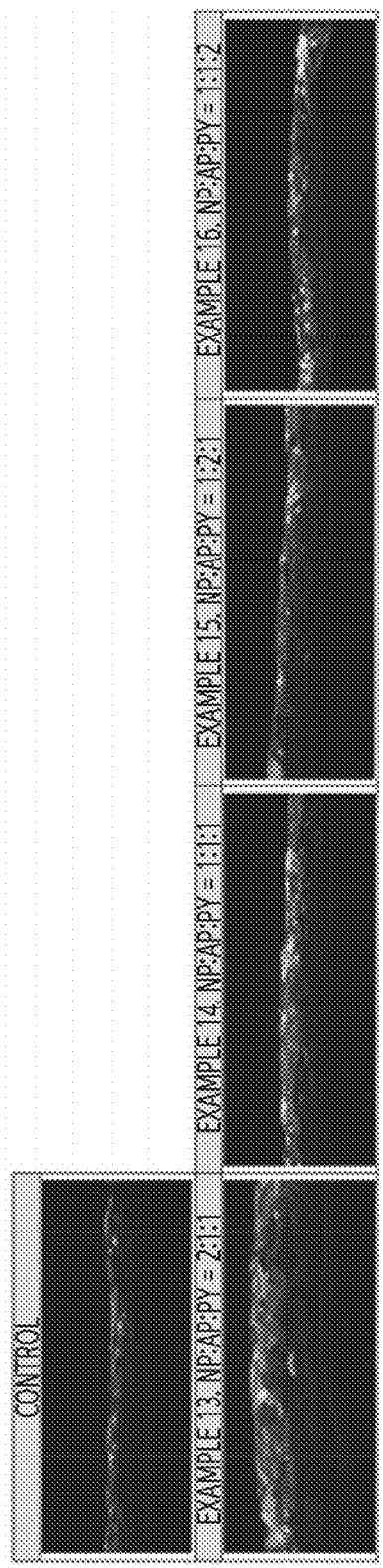
FIG. 7 illustrates images showing the effect of a composition according to an embodiment on the expression level of loricrin in the skin.
Figure 8:
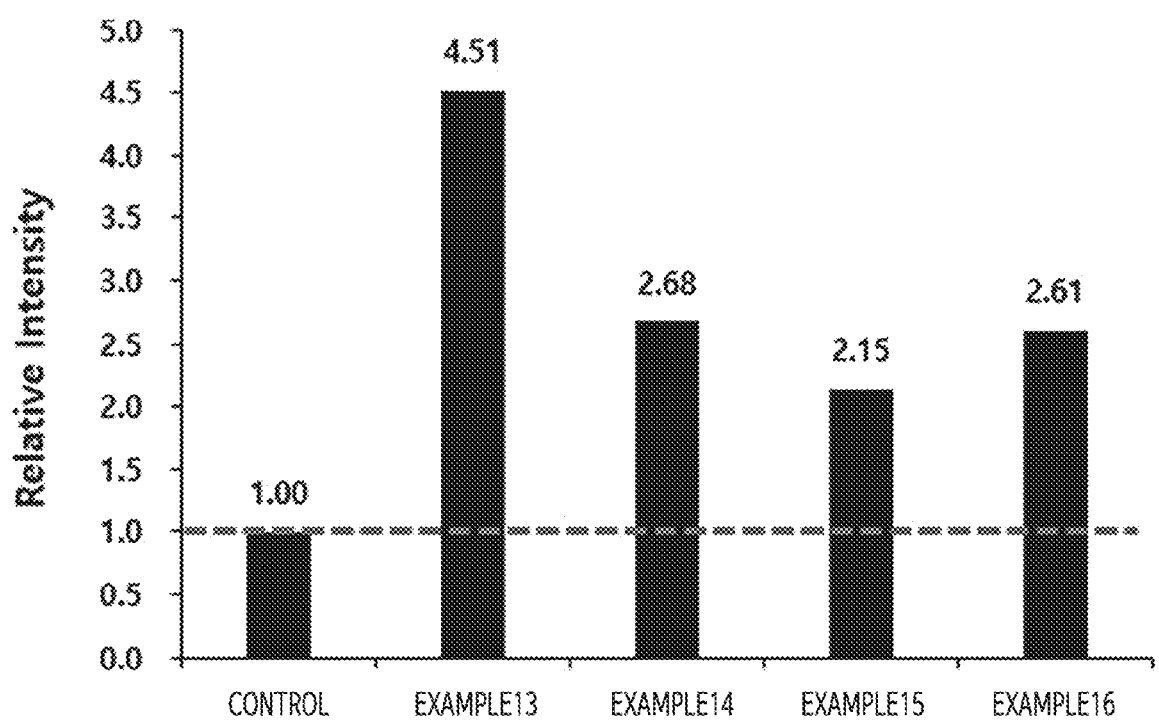
FIG. 8 is a graph showing the effect of a composition according to an embodiment on the expression level of loricrin in the skin model.
Figure 9:
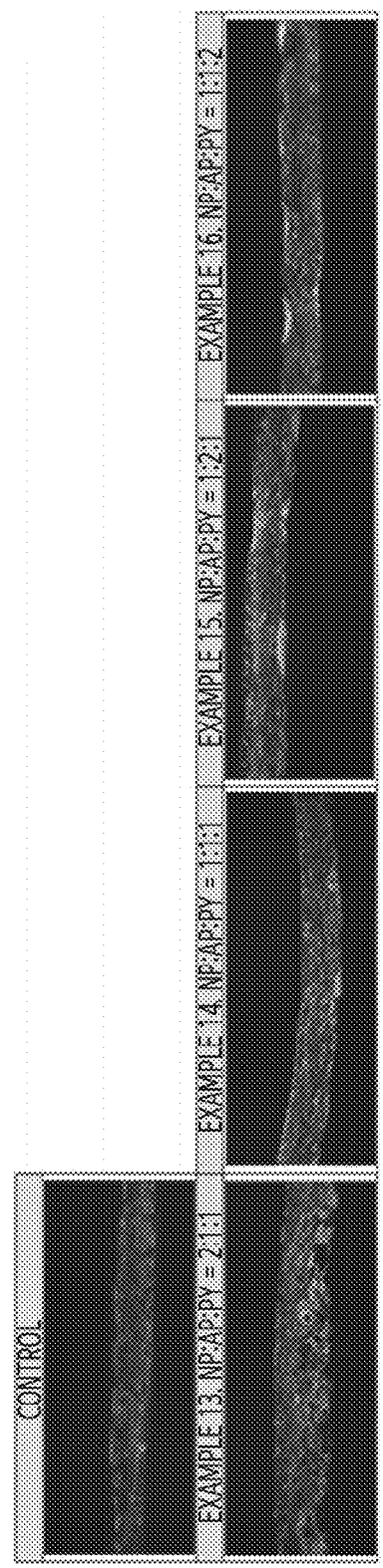
FIG. 9 illustrates images showing the effect of a composition according to an embodiment on the expression level of involucrin in the skin model.
Figure 10:
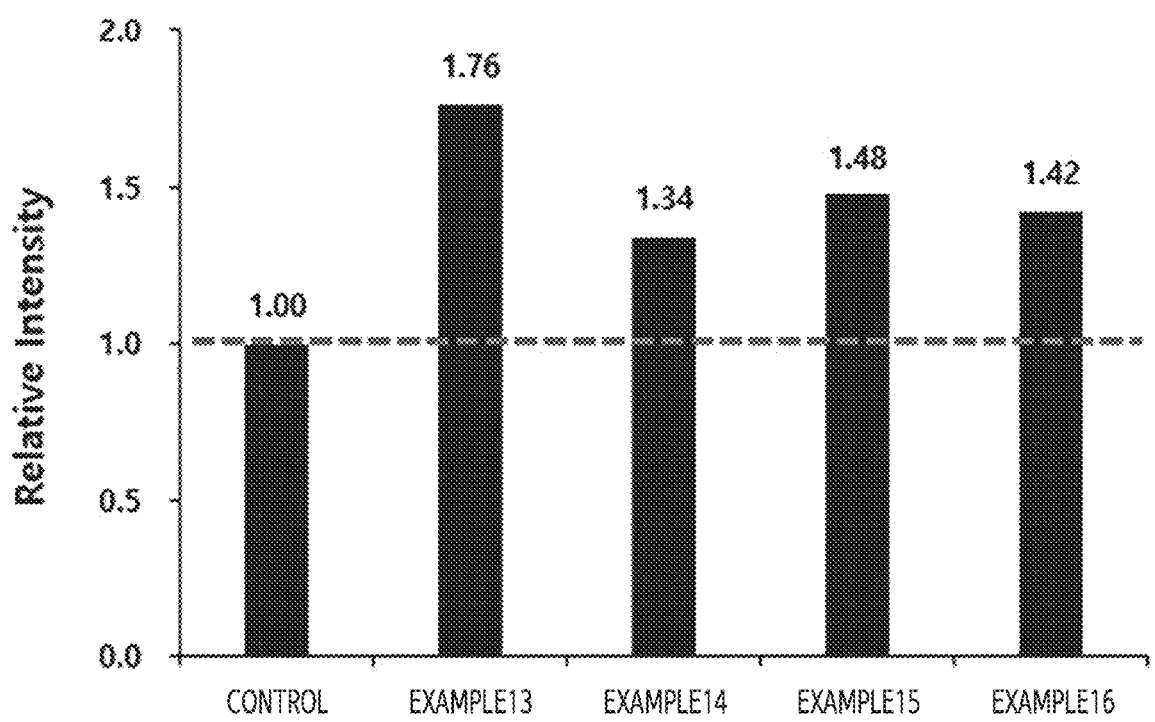
FIG. 10 is a graph showing the effect of a composition according to an embodiment on the expression level of involucrin in the skin model.

As a result, as illustrated in FIGS. 5 and 6, it was confirmed that the skin barrier was shown to be thicker in creams according to embodiments than in the control, and in particular, the largest skin barrier thickness was shown in the composition of Example 13. These results indicate that the composition according to an embodiment has the effect of improving skin conditions, e.g., strengthening the skin barrier.

Experimental Example 3. Confirmation of
Expression of Skin Differentiation Factors
According to Ceramide Ratio To verify the difference in expression of skin differentiation factors according to a ceramide content ratio, each of the creams of Examples 13 to 16 was applied to under-developed 3D skin model, and then changes in loricrin and involucrin were examined.

The expression of loricrin and involucrin was analyzed by immunofluorescence in the same manner as in Experimental Example 1, and the results thereof are illustrated in FIGS. 7 to 10.

As a result, as illustrated in FIGS. 7 to 10, it was confirmed that the skin differentiation factors were highly expressed in creams according to embodiments as compared to the control, and in particular, the highest expression of the skin differentiation factors was shown in the composition of Example 13. These results indicate that the composition according to an embodiment has the effect of improving skin conditions, e.g., strengthening the skin barrier and skin moisturizing.

Experimental Example 4. Confirmation of Effect of
Ceramide EOP on Skin Moisturizing and Barrier
Factors To confirm the effect of ceramide EOP (hereinafter, EOP) on skin moisturizing and barrier factors, each of the creams including 0.01% and 0.1% of EOP was applied to 3D skin model, and then the amounts of aquaporin 3, filaggrin, and ceramide were identified.

Figure 11:
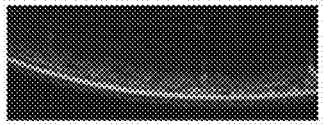
FIG. 11 illustrates images showing the effect of ceramide 1 (ceramide EOP) on the expression levels of aquaporin 3, filaggrin, and ceramide.
Figure 12:
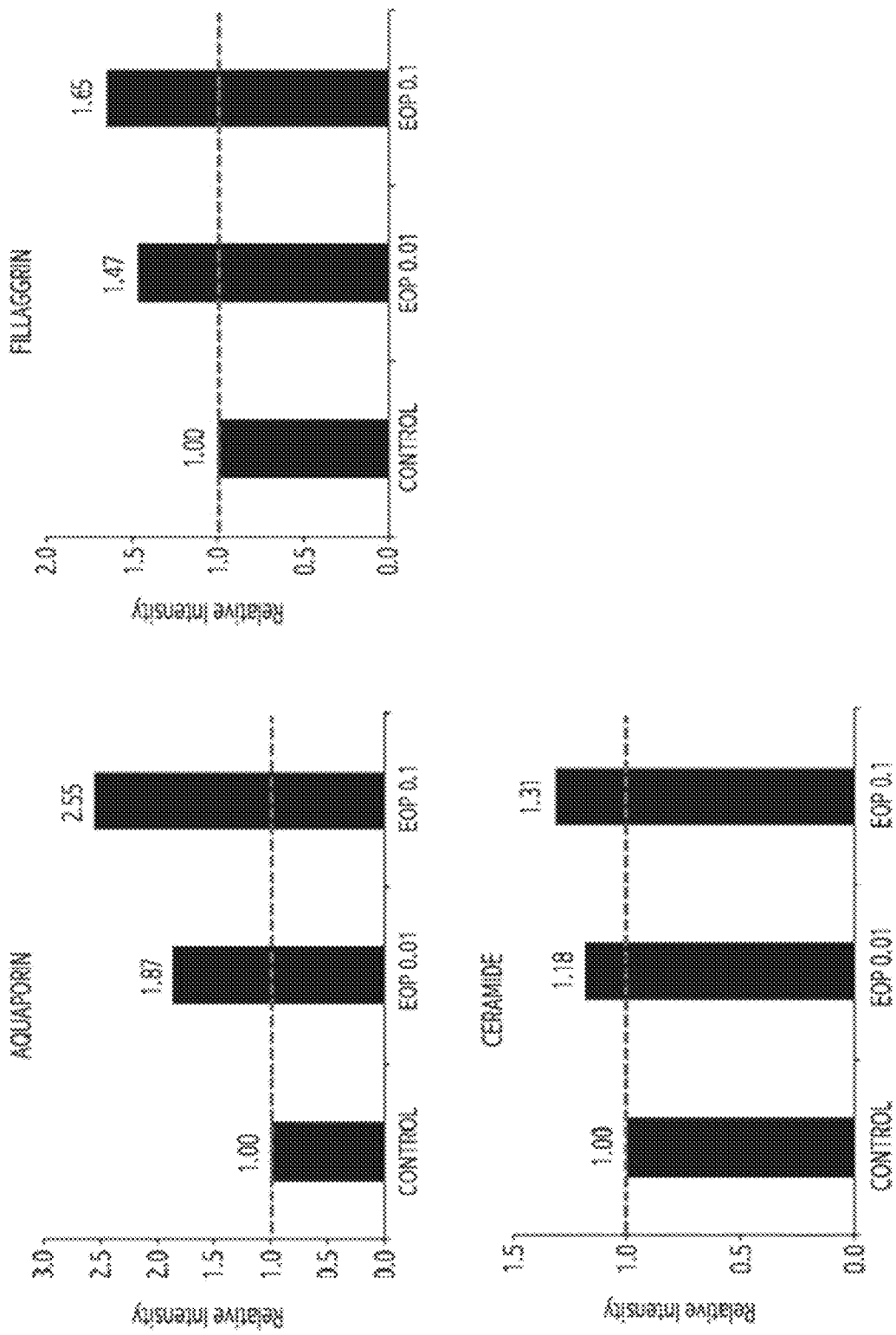
FIG. 12 illustrates graphs showing the effect of ceramide 1 (ceramide EOP) on the expression levels of aquaporin 3, filaggrin, and ceramide.

The moisturizing and barrier factors were analyzed by immunofluorescence in the same manner as in Experimental Example 1, and the results thereof are illustrated in FIGS. 11 and 12.

As a result, as illustrated in FIGS. 11 and 12, it was confirmed that, in the case of containing EOP, the amounts of aquaporin 3, filaggrin, and ceramide increased as compared to the control, and the moisturizing factors were increased in a concentration-dependent manner.

Experimental Example 5. Confirmation of Effect of
Ceramide EOP on Enhancing Efficacy of Ceramide
Mixture To confirm whether EOP enhances the efficacy of a ceramide mixture, each of the creams of Examples 17 and 18 was applied to 3D skin model, and then the skin moisturizing and differentiation factors were examined.

The expression of aquaporin 3, filaggrin, loricrin, and involucrin was identified by immunofluorescence in the same manner as in Experimental Example 1, and skin thickness was identified through H&E staining in the same manner as in Experimental Example 2.

Figure 13:
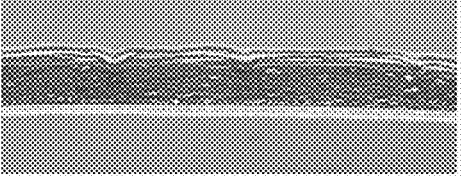
FIG. 13 illustrates images showing the effect of a composition according to an embodiment on skin thickness and the expression levels of aquaporin 3, filaggrin, loricrin, and involucrin.
Figure 14:
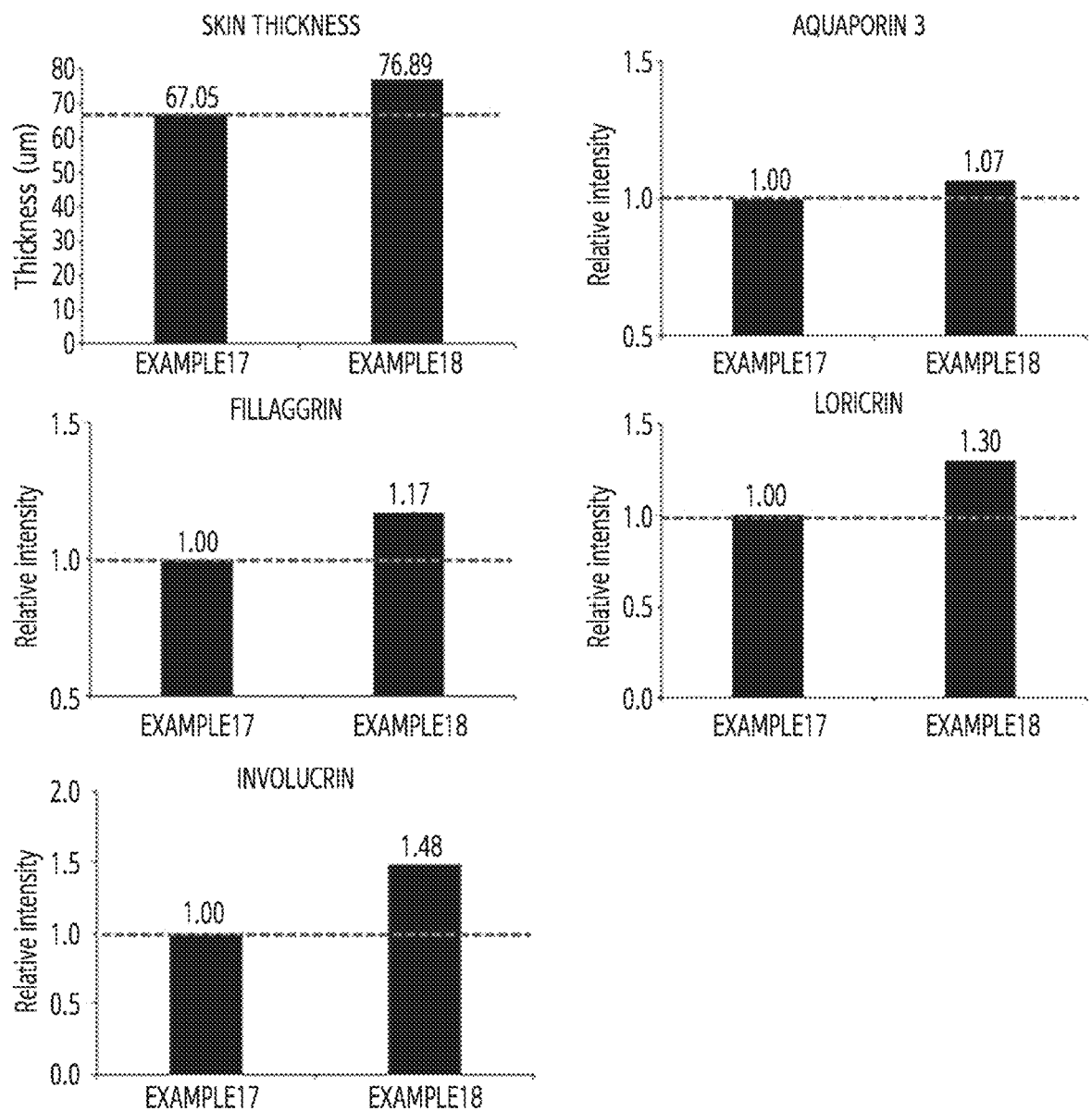
FIG. 14 illustrates graphs showing the effect of a composition according to an embodiment on skin thickness and the expression levels of aquaporin 3, filaggrin, loricrin, and involucrin.
Figure 15:
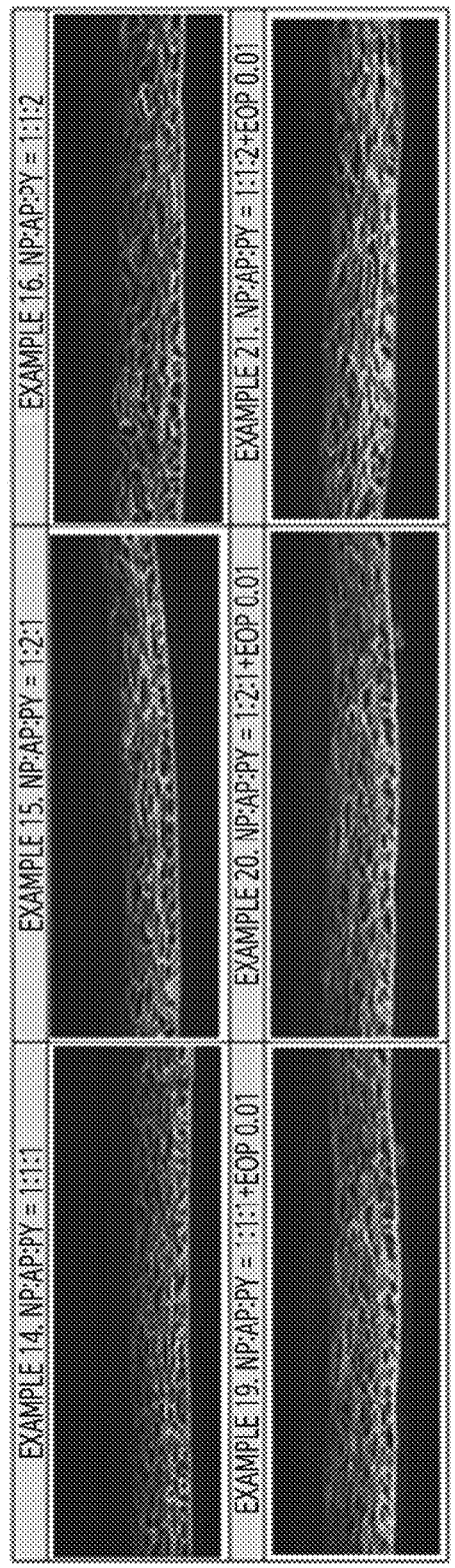
FIG. 15 illustrates images showing the effect of a composition according to an embodiment on the expression level of aquaporin 3.
Figure 16:
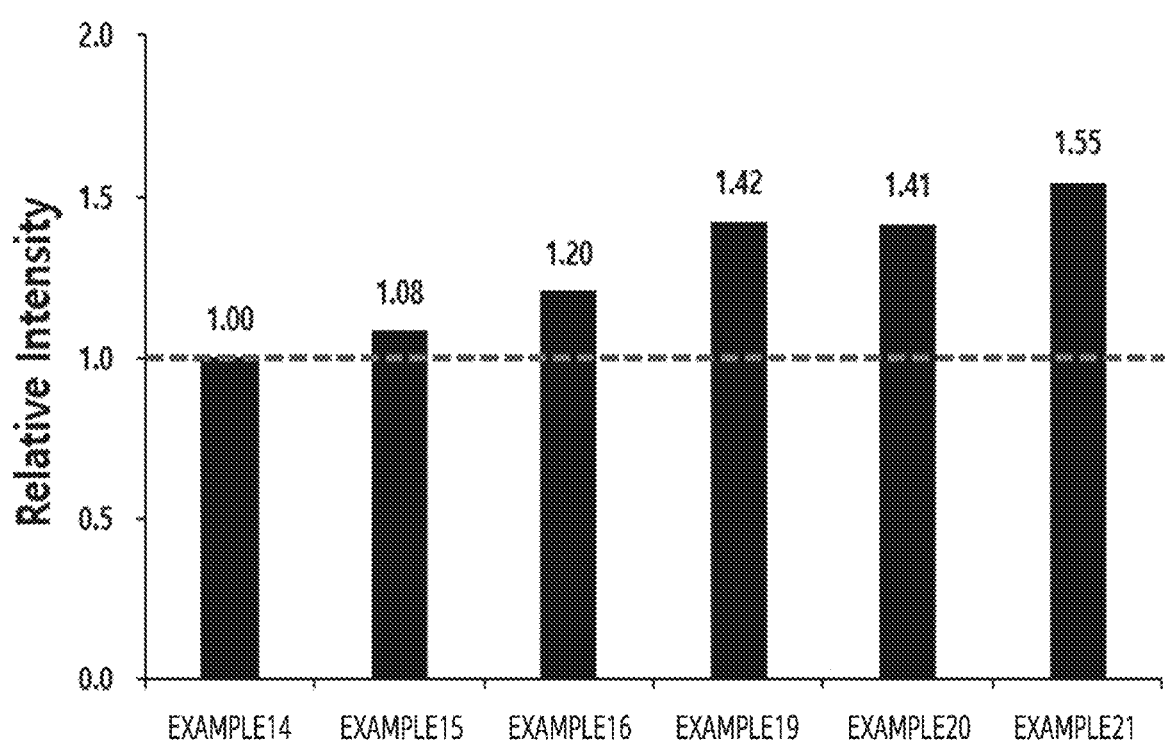
FIG. 16 is a graph showing the effect of a composition according to an embodiment on the expression level of aquaporin 3.
Figure 17:
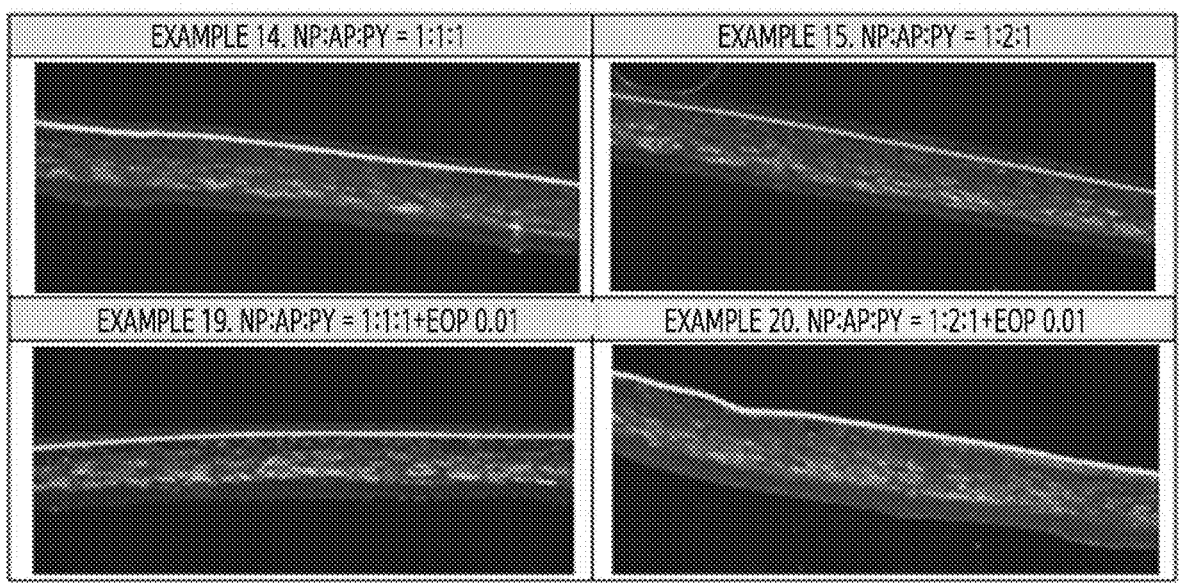
FIG. 17 illustrates images showing the effect of a composition according to an embodiment on the expression level of filaggrin.
Figure 18:
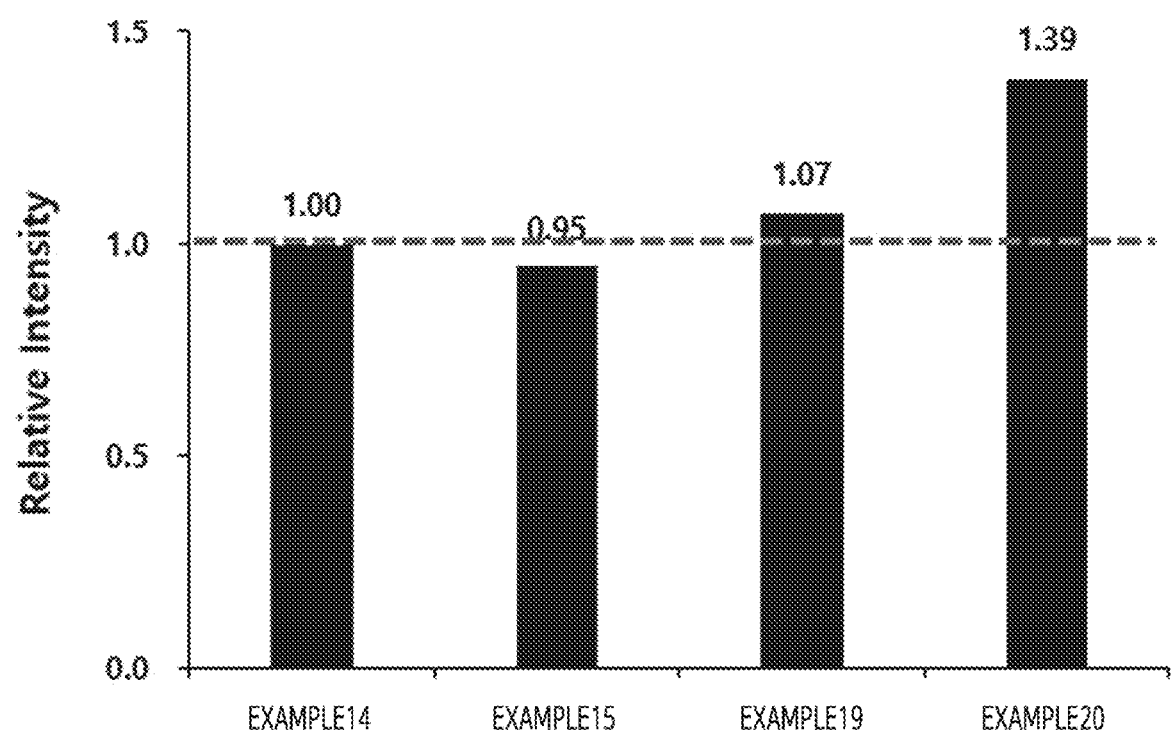
FIG. 18 is a graph showing the effect of a composition according to an embodiment on the expression level of filaggrin.

The analysis results are illustrated in FIGS. 13 and 14. As illustrated in FIGS. 13 and 14, in the case of containing EOP, the skin became thicker in a concentration-dependent manner, and the expression of all the skin moisturizing and differentiation factors was increased. These results indicate that the composition according to an embodiment has the effect of improving skin conditions, for example, strengthening the skin barrier and skin moisturizing.

Experimental Example 6. Confirmation of Effect of
Ceramide EOP on Enhancing Moisturizing Ability
of Ceramide To verify that the increased expression of the skin moisturizing and differentiation factors, confirmed through Experimental Example 5, is caused by EOP, not by the ratio of NP to AP to PY, each of the creams of Examples 14, 15, and 16 containing NP, AP, and PY at different ratios and each of the creams of Examples 19, 20, and 21 further containing EOP were applied to 3D skin model, and then the expression of aquaporin 3 and filaggrin was examined.

The moisturizing factors were analyzed by immunofluorescence in the same manner as in Experimental Example 1, and the results thereof are illustrated in FIGS. 15 to 18.

As illustrated in FIGS. 15 to 18, it was confirmed that, in the case of containing EOP, the expression of the moisturizing factors was increased, as compared to the case of containing NP, AP, and PY alone. These results indicate that the composition according to one embodiment has the effect of improving skin conditions, for example, moisturizing the skin.

Advantageous Effects of Disclosure

A composition including two or more different ceramides and a sphingolipid, according to an embodiment, has the activity of increasing a ceramide content in the skin, increasing the expression level of aquaporin 3, increasing the expression level of fillaggrin, increasing the expression level of loricrin, increasing the expression level of involucrin, and increasing the skin thickness, and thus can be effectively used for improving skin conditions.

The foregoing description of the present disclosure is provided for illustrative purposes, and it will be understood by those of ordinary skill in the art to which the present disclosure pertains that the disclosure may be easily modified in different specific forms without departing from the technical ideas or essential characteristics of the present disclosure. Therefore, it is to be understood that the above-described embodiments are illustrative in all aspects and not restrictive.

What is claimed is:

1. A cosmetic composition comprising: three or more different ceramides; and a sphingolipid, wherein:
    the three or more different ceramides are each a synthetic ceramide and comprise ceramide NP, ceramide AP, and ceramide EOP;
    the sphingolipid comprises phytosphingosine;
    the ceramide EOP is present in an amount of 0.001 wt % to 0.05 wt % with respect to a total weight of the cosmetic composition; and
    the ceramide NP, the ceramide AP, and the phytosphingosine are mixed in a weight ratio of ceramide NP:ceramide AP:phytosphingosine=2:1:1.

2. The cosmetic composition of claim 1, wherein the cosmetic composition is for improving skin conditions, wherein the improvement of the skin conditions comprises skin moisturizing, strengthening the skin barrier, skin aging improvement, skin wrinkle improvement, skin elasticity improvement, skin regeneration, or skin whitening.

3. The cosmetic composition of claim 1, further comprising at least one selected from the group consisting of a stabilizer, a surfactant, oil, a chelating agent, a polyol, a preservative, and a thickener.

4. The cosmetic composition of claim 1, wherein the cosmetic composition has any one formulation selected from the group consisting of a skin toner, a lotion, a cream, an essence, a pack, a foundation, a soap, a cleansing product, a body moisturizer, a hair product, and a cleaning agent.

5. The cosmetic composition according to claim 1, wherein the ceramide EOP is present in an amount of 0.001 wt % to 0.01% with respect to the total weight of the composition.

* * * * *